W. H. KLOCKE.
NUT LOCK.
APPLICATION FILED FEB. 27, 1920.
1,394,740.
Patented Oct. 25, 1921.
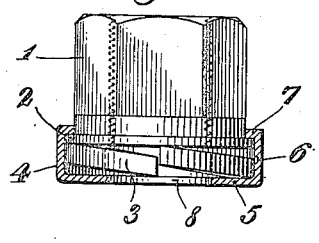
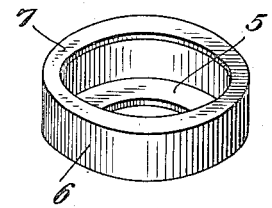
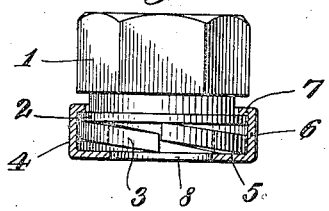
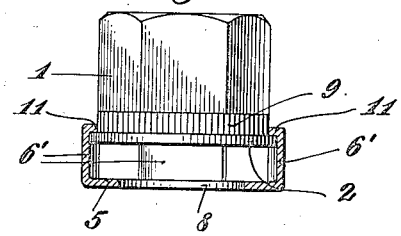
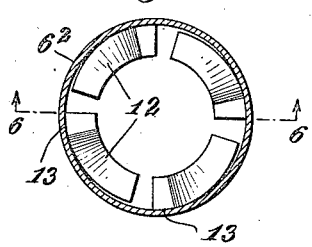
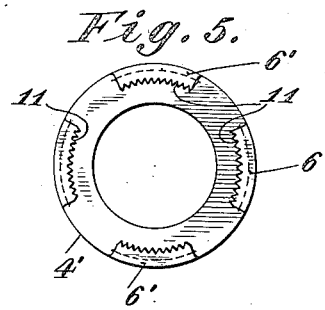
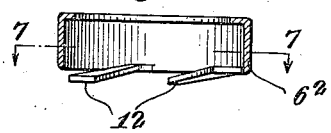
Inventor
WILLIAM H. KLOCKE
By his Attorney
Jas. H. Griffin.

UNITED STATES PATENT OFFICE.

WILLIAM H. KLOCKE, OF WOODHAVEN, NEW YORK, ASSIGNOR OF ONE-HALF TO HARRY F. HUGHES, OF BROOKLYN, NEW YORK.

NUT-LOCK.

1,394,740.   Specification of Letters Patent.   Patented Oct. 25, 1921.

Application filed February 27, 1920. Serial No. 361,802.

*To all whom it may concern:*

Be it known that I, WILLIAM H. KLOCKE, a citizen of the United States, residing at Woodhaven, county of Queens, and State of New York, have invented a certain new and useful Nut-Lock, of which the following is a specification.

This invention is a nut lock and the object of the invention is to primarily provide a nut lock which will positively preclude a nut from working loose in a bolt due to vibration, jars or other causes.

Nut locks have long been employed particularly where the structure with which they are associated is subject to jar or vibration, which would otherwise serve to cause the loosening of the nut and rattling of the parts normally held rigid thereby. It has been the practice to form nut locks in the shape of substantially one complete convolution of a flat face helical spring adapted to be dropped over the bolt and the nut thereafter screwed into place to put the spring under tension. The ends of the spring are usually cut over so that the spring at its terminal edges is rather sharp to adapt it to grip the nut as well as the surface opposing the same. Through the gripping action of the spring and the inherent resiliency thereof, the nut is locked against inadvertently working loose. At times when the surface against which the spring lock engages is varnished or otherwise finished, or when the nut is so positioned that it is required to be frequently removed, it is not expedient to have the spring engage directly with such surface, since the gouging of the sharp spring end would spoil the finish or unduly mar the surface. In such instances, an ordinary flat washer, usually termed a "base washer", is positioned between the spring and the surface so as to protect the latter.

While this association of parts is almost universally employed and operates with high efficiency, it is open to several disadvantages, chief among which may be mentioned the inconvenience of handling a plurality of parts and the tendency, during the positioning on or the removal of the parts from the bolt, to drop one or more of the parts into associated machinery. This is particularly true in automobile construction where the space allowed for working is restricted. Manifestly, if a nut or washer is dropped into the crank or transmission cases, there is a great likelihood that it may fall between gears or other moving parts and, unless its presence is noted, the subsequent operation of the engine will be apt to cause breakage or straining of the parts. Moreover, when the nut spring and washer are removed and laid aside temporarily to make repairs, or for other reasons, some of these parts are very apt to become lost, frequently occasioning delay in the obtaining of new parts, or a tendency on the part of mechanics to reassemble the machinery without the washer or nut lock.

With these considerations in mind, the object of the present invention, from a more specific standpoint, is to provide a nut lock, and nut, which are assembled so that they may be handled as a unit, thereby greatly facilitating and expediting the assembly or dismantling of the parts which they hold in position and the device of this invention may, or may not, as desired, have associated therewith a base washer forming part of the unit assemblage.

Features of the invention, other than those specified, will be apparent from the hereinafter detailed description and claims, when read in conjunction with the accompanying drawings.

The accompanying drawings illustrate one practical embodiment of the invention, but the construction therein shown is to be understood as illustrative, only, and not as defining the limits of the invention.

Figure 1 illustrates an automobile nut with which the present invention is shown as associated. In this figure a so-called "shell" is shown in section in the interest of clearness.

Fig. 2 is a perspective view of the shell shown in Fig. 1.

Fig. 3 shows the same general construction as Fig. 1 associated with a machine nut.

Fig. 4 illustrates a modified form of the invention, wherein means is provided for locking the shell against inadvertent rotation relative to the nut and which shell is skeletonized.

Fig. 5 is a plan view with the shell of Fig. 4 removed.

Fig. 6 is a cross section of a modified form of shell; and,

Fig. 7 is a section on the line 7—7 of Fig. 6.

Referring to the drawings and more particularly to Figs. 1 and 2, 1 designates an automobile nut, which, in adapting the present invention thereto, is provided with an upset flange 2 at its base. 3 designates a helical spring lock washer of any well known conventional type, and 4 designates a retaining member, whereby the spring lock washer 3 and nut 1 may be removed to be handled as a unit. In practice, the retaining member 4 may vary in form without departing from the invention, but for the purpose of illustration, I have shown the same in Fig. 2 in the form of a sheet metal shell having a bottom 5, sides 6 and a top flange 7. The bottom 5 is apertured at 8 so as to allow of the passage of the bolt therethrough and said bottom is secured to the nut 1 by the sides 6, the upper end of which is flanged over at 7 to overlie the flange 2 of the nut 1, so that the shell 4 serves as a housing for securing the spring lock washer 3 to the nut. The nut is, however, normally free for rotation relative to the shell and lock washer so that the whole may be picked up as a unit and readily screwed down on a bolt. It will be noted that in this embodiment of the invention, the bottom 5 underlies the lock washer and performs the function of the base washers generally employed. When construed as a base washer, the sides 6 serve to simultaneously support the base washer and the lock washer relative to the nut.

In Fig. 3, the same general construction shown in Figs. 1 and 2 is illustrated, with the exception that a machine nut is shown which is circumferentially channeled to provide a flange at its base instead of the flange being upset as shown in Fig. 1.

In Figs. 4 and 5, a structure is shown which may be applied to either of the types of nuts shown in Figs. 1 and 3. In this embodiment, the portion 9 of the nut directly above the flange 2 is knurled or toothed as shown and the shell 4', which corresponds to the shell 4, is skeletonized, so that instead of having a solid side wall 6, portions thereof are cut away to form spring fingers 6'. The free ends of the spring fingers are inwardly flanged and are knurled or toothed at 11 to correspond to the portion 9 of the nut. The base of the shell 4' is solid to perform the functions of a base washer as previously described. In Figs. 4 and 5, I have for the purpose of clearness omitted the lock washer from the drawing.

When positioning the assembly of Figs. 4 and 5 on a bolt, the nut may be readily seated or unseated by a wrench in the usual way and when such power is applied, the spring fingers 6' will simply ride over the knurled portion 9, after the manner of a ratchet. However, when the nut is screwed down tight, it will be held against working loose, not only by the lock washer, but by the locking engagement between the knurled ends of the spring fingers and the knurled portion 9, which, because of the friction between the lock washer, base washer and adjacent surface of the machine, will be precluded from rotation and will assist in precluding rotation of the nut on the bolt. In the structure of these figures, the spring fingers 6', in addition to the functions mentioned, have the further function of supporting the base washer and the lock washer on the nut so that the whole may be handled as a unit.

In Figs. 6 and 7, a form of shell is shown, the underlying thought of which may be incorporated in any of the foregoing embodiments of the invention. The structure of these latter figures is intended for use where a base washer is not desired, and it is preferred that the sharpened ends of the spring washer be allowed to grip the adjacent surface of the machine. When this is the case, the bottom of the shell, instead of being made solid may be cut to form a plurality of tongues 12, secured at 13 to the side walls 6², which may be either skeletonized or not. When this structure is used, the end of the spring washer will engage the adjacent surface through the openings between the opposite ends of adjacent tongues 12, so that all the benefits of the gripping action of the spring washer may be obtained.

From the foregoing description of the present invention, in some of its preferred, practical forms, it will be apparent to those skilled in the art, that the same provides a novel unit assemblage of the parts, whereby they may be conveniently handled during the positioning on or removal of the nut from the bolt. The construction is simple, economical to manufacture, and efficient, and the tendency to drop lock washers or base washers into the parts of associated machinery is minimized. The assembly is such that the parts cannot become separate and the nut cannot be replaced on a bolt after removal therefrom, without, necessarily, returning the associated parts therewith. The present invention is not limited to use on automobiles or other machinery, but is adapted for general application, and may be used in the bolting of railway fish plates, in position, or in any other environment where nut locks are desirable. For these reasons, the specific details of construction may be varied from those shown in adapting the invention to these various environments, and, accordingly, the invention is to be understood as not limited to the specific showing made, but is to be construed as as broadly novel as is commensurate with the appended claims.

Having thus fully described the invention, what I claim as new and desire to secure by Letters Patent is:

1. An assemblage of the class described embodying a nut provided with a flat base, a base washer, a split spring lock washer positioned intermediate the base of the nut and the base washer and in direct engagement with the base washer and the flat base of the nut, and means, integral with the base washer, for securing the base washer and lock washer to the nut, so that they may be handled as a unit, while permitting of manual rotation between the parts.

2. An assemblage of the class described embodying a nut, a base washer, a split spring lock washer positioned intermediate the base of the nut and the base washer, means for securing the base washer and lock washer to the nut, so that they may be handled as a unit, while permitting of manual rotation between the parts, and means, associated with the securing means and with a nut, for precluding inadvertent rotation between the base washer and the nut.

3. An assemblage of the class described embodying a nut, a base washer, a lock washer positioned between the base of the nut and the base washer, resilient means for securing the base washer and lock washer to the nut, so that they may be handled as a unit, while permitting of manual rotation between the parts, and means associated with the resilient means and with the nut for precluding inadvertent rotation between the base washer and the nut.

4. An assemblage of the class described embodying a nut, provided with a flange and having a knurled portion adjacent thereto, a base washer, a lock washer positioned intermediate the base of the nut and the base washer, and spring fingers extending from the base washer to the opposite face of the flange of the nut, the free ends of which spring fingers are in-turned over the flange of the nut to secure the base washer and lock washer to the nut and are serrated for cooperation with the knurled portion of the nut, whereby inadvertent rotation between the base washer and nut is precluded.

5. An assemblage of the class described embodying a nut, a split spring lock washer engaging the base thereof, and means for securing the lock washer to the nut, so that the lock washer and nut may be handled as a unit and yet permit of manual rotation between the nut, lock washer and base washer.

6. An assemblage of the class described embodying a nut provided with an annular flange, a split spring lock washer engaging the base of the nut, and a shell flanged over the flange of the nut and engaging with the distant face of the lock washer for securing the lock washer to the nut, whereby the lock washer, shell and nut may be handled as a unit, and yet permit of relative rotation between the shell and nut.

In testimony whereof, I have signed my name to this specification.

WILLIAM H. KLOCKE.